US012659280B2

(12) United States Patent
Cho et al.

(10) Patent No.: US 12,659,280 B2
(45) Date of Patent: Jun. 16, 2026

(54) METHOD AND SYSTEM FOR APPLICATION DIFFERENTIATED LOW LATENCY, LOW LOSS, AND SCALABLE THROUGHPUT RATE CONTROL

(71) Applicant: Verizon Patent and Licensing Inc.,
Basking Ridge, NJ (US)

(72) Inventors: Yong Sang Cho, Old Tappan, NJ (US);
Muhammad Salman Nomani,
Hillsborough, NJ (US); Shen-De Lin,
Morris Plains, NJ (US); Jae Cho,
Demarest, NJ (US); Jeremy Nacer,
Boca Raton, FL (US)

(73) Assignee: Verizon Patent and Licensing Inc.,
Basking, Ridge, NJ (US)

( * ) Notice: Subject to any disclaimer, the term of this patent is extended or adjusted under 35 U.S.C. 154(b) by 101 days.

(21) Appl. No.: 18/662,324

(22) Filed: May 13, 2024

(65) Prior Publication Data

US 2025/0350563 A1      Nov. 13, 2025

(51) Int. Cl.
*G06F 15/173*        (2006.01)
*H04L 47/25*         (2022.01)
*H04W 28/02*         (2009.01)

(52) U.S. Cl.
CPC ......... *H04L 47/25* (2013.01); *H04W 28/0236* (2013.01); *H04W 28/0289* (2013.01)

(58) Field of Classification Search
CPC ....... H04L 47/25; H04L 47/36; H04L 47/263; H04L 47/283
See application file for complete search history.

(56) References Cited

U.S. PATENT DOCUMENTS

2019/0129960 A1* 5/2019 Srinivasaraghavan ......................
                                    G06F 16/248
2019/0394137 A1* 12/2019 Zeng ........................ H04L 47/25
2025/0211536 A1* 6/2025 Gupta ..................... H04L 47/30

* cited by examiner

*Primary Examiner* — Yves Dalencourt

(57) ABSTRACT

A method, a network device, and a non-transitory computer-readable storage medium are described in relation to an application differentiated-based L4S service. The service includes receiving feedback information from end devices associated with the application sessions pertaining to the same application and same network. The service further includes calculating a prospective data rate for each of the end devices based on a data rate adjustment value, a weighting value, and a current data rate. The service may further include applying each prospective data rate during each of the application sessions of a prospective time period. The service may include monitoring protocol delays and marking packets with congestion notification when the protocol delays do not satisfy a latency budget.

20 Claims, 7 Drawing Sheets

400

ESTABLISH AND MAINTAIN APPLICATION SESSIONS WITH END DEVICES
405

OBTAIN L4S FEEDBACK INFORMATION FROM EACH OF THE END DEVICES
410

DETERMINE NUMBER OF END DEVICES SATSIFY A THRESHOLD VALUE
415

MONITOR ECN RATE FOR EACH OF THE END DEVICES
420

CACLULATE A DATA RATE ADJUSTMENT FACTOR FOR EACH OF THE END DEVICES BASED ON THE ECN RATE AND THE L4S FEEDBACK INFORMATION
425

CALCULATE A WEIGHTING VALUE FOR EACH OF THE END DEVICES
430

CALCULATE A PROSPECTIVE APPLICATION DATA RATE FOR EACH OF THE END DEVICES
435

EXECUTE THE PROSPECTIVE APPLICATION DATA RATE FOR EACH OF THE END DEVICES
440

200

CALCULATES WEIGHTING VALUE 217

CALCULATES DATA RATE ADJUSTMENT FACTOR 215

L4S FEEDBACK INFORMATION 206

EXTERNAL NETWORK 115

APP SERVER 202

TRAFFIC FLOWS 204

CORE NETWORK 120

ACCESS NETWORK 105 gNB 201

END DEVICES 130

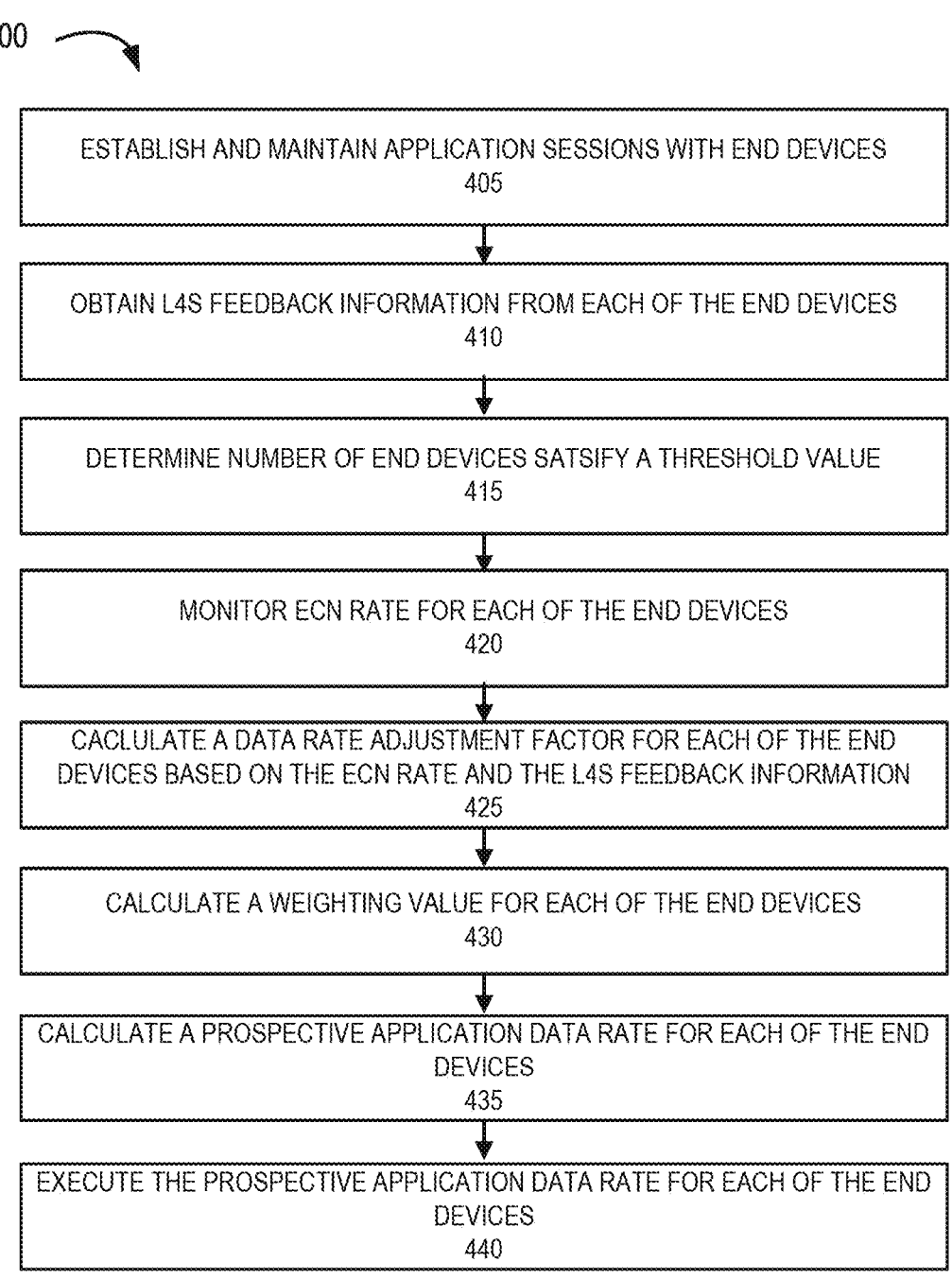

400

ESTABLISH AND MAINTAIN APPLICATION SESSIONS WITH END DEVICES
405

OBTAIN L4S FEEDBACK INFORMATION FROM EACH OF THE END DEVICES
410

DETERMINE NUMBER OF END DEVICES SATSIFY A THRESHOLD VALUE
415

MONITOR ECN RATE FOR EACH OF THE END DEVICES
420

CACLULATE A DATA RATE ADJUSTMENT FACTOR FOR EACH OF THE END DEVICES BASED ON THE ECN RATE AND THE L4S FEEDBACK INFORMATION
425

CALCULATE A WEIGHTING VALUE FOR EACH OF THE END DEVICES
430

CALCULATE A PROSPECTIVE APPLICATION DATA RATE FOR EACH OF THE END DEVICES
435

EXECUTE THE PROSPECTIVE APPLICATION DATA RATE FOR EACH OF THE END DEVICES
440

IDENTIFY AN APPLICATION BASED ON PACKET INSPECTION
505

MONITOR A PROTOCOL DELAY
510

LATENCY BUDGET
SATISFIED?
515

YES

NO

MARK A PACKET WITH ECN
520

METHOD AND SYSTEM FOR APPLICATION DIFFERENTIATED LOW LATENCY, LOW LOSS, AND SCALABLE THROUGHPUT RATE CONTROL

BACKGROUND

End devices may connect to a radio access network (RAN) according to several types of configurations and may be afforded different quality of service (QoS) levels. Various mechanisms and technologies may be used to ensure the delivery of certain performance metrics, such as minimal latency and packet loss, as well as high throughput and other types of network performance criteria. Low latency, low loss, and scalable throughput (L4S) is a technology whose aim is to drastically reduce latency experienced by packets traveling across the Internet, support high throughput, and provide rate adaptation management mechanisms that reduce network congestion.

BRIEF DESCRIPTION OF THE DRAWINGS

FIG. 4 is a flow diagram illustrating an exemplary process of an exemplary embodiment of the application differentiated-based L4S service.

DETAILED DESCRIPTION

Figure 1:
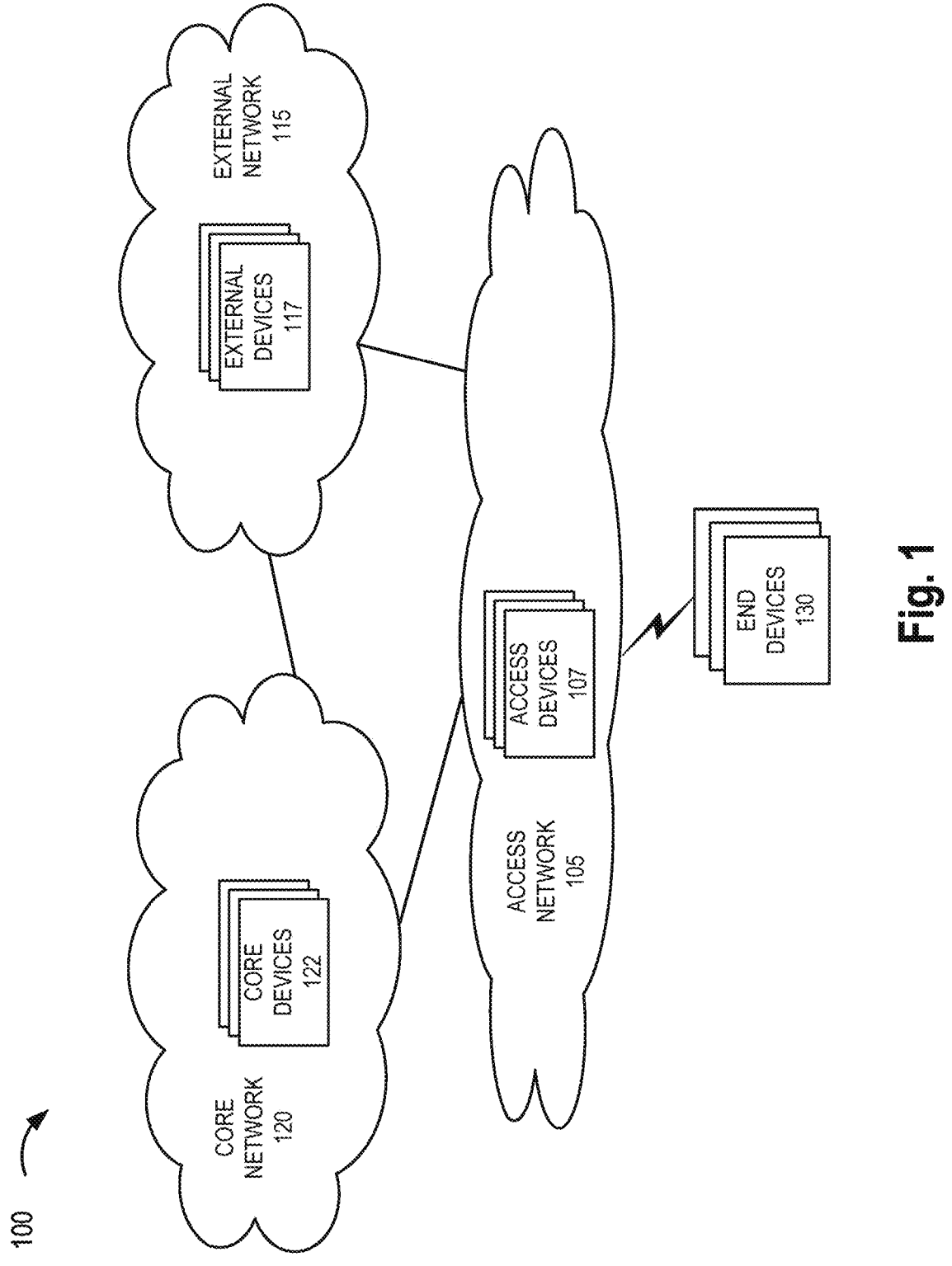
FIG. 1 is a diagram illustrating an exemplary environment in which an exemplary embodiment of an application differentiated-based L4S service may be implemented.

The following detailed description refers to the accompanying drawings. The same reference numbers in different drawings may identify the same or similar elements. Also, the following detailed description does not limit the invention.

L4S mechanisms may drastically reduce latency experienced by packets traveling across the Internet and may support high throughput. L4S may provide fast rate adaptation management and may reduce network congestion, queuing, and packet loss. An Explicit Congestion Notification (ECN) scheme at the Internet Protocol (IP) layer may be used to support L4S. Typically, L4S mechanisms may be applied independently to different cross-sections of the network, such as a RAN, a core network, a transport network, and a user IP layer, primarily due to different protocols used like tunneling, headers, and other factors.

When there are multiple users on L4S applications under the same network, each application may have different strategies for data rate control. For example, when the network is congested, an application A may have a more aggressive data rate control policy compared to an application B, which may result in unintended disadvantages for users of application A relative to users of application B. Additionally, an application server may not know the change in network congestion. Therefore, optimization of data rate control for each application server is difficult.

According to exemplary embodiments, an application differentiated-based L4S service is described herein. According to an exemplary embodiment, the application differentiated-based L4S service may be implemented by a network device. For example, the network device may be implemented by an application server that hosts and provides an application service to end devices, as described herein.

According to an exemplary embodiment, the application differentiated-based L4S service may include balancing the degree of data rate control across different applications or multiple users on the same network. According to an exemplary embodiment, the network device that hosts the application (e.g., an application server or the like) may transmit content to end devices and the end devices may provide L4S feedback information. According to an exemplary embodiment, the L4S feedback information may include performance data, such as Quality of Experience (QoE) values, key performance indicator (KPI) values, Quality of Service (QoS) values, Mean Opinion Score (MOS) values, service level agreement (SLA) values and/or the like information. For example, the performance data may include one or multiple types of performance metrics and values relating to round-trip time (RTT), jitter, frame rate of video, packet loss, image compression rate of video, MOS for voice quality, Peak Signal-to-Noise Ratio (PSNR) of images, variation of throughput and/or bitrate, and the like.

According to an exemplary embodiment, the L4S feedback information may include location information. For example, the location information may include Global Positioning System (GPS) coordinates (latitude, longitude) and/or another form of position information, geographical coordinates, or the like. According to an exemplary embodiment, the location information may include a global cell identifier and/or a physical cell identifier associated with a RAN device of relevance (e.g., to which the end device is connected). According to an exemplary embodiment, the location information may include historical, current, and/or prospective location of the end device. According to some exemplary embodiments, the location information may include other types of position-related information, such as end device mobility information. For example, the end device mobility information may include data pertaining to speed, velocity, altitude, azimuth, and/or the like associated with the end device. According to an exemplary embodiment, when the application server is associated with the network operator (e.g., versus a third party), the location information may include a network slice identifier, a bearer identifier (e.g., a radio bearer identifier, a core network bearer identifier, etc.), a RAN device identifier, a core network device identifier, and the like.

According to an exemplary embodiment, the application differentiated-based L4S service may calculate data rates for the end devices based on the performance data and the location information, as described herein. According to an exemplary embodiment, the application differentiated-based L4S service may identify end devices using the same application and network, and based on this identification, calculate a data rate for a next segment of data. According to an exemplary embodiment, the application differentiated-based L4S service may calculate the data rate based on a weighting factor, a data rate adjustment factor, an ECN rate (e.g., percentile of ECN marked packets or another numerical value, ratio, or the like), and the performance data. According to an exemplary embodiment, the weighting factor may be calculated based on a ratio between a next target application throughput associated with an end device and a total aggregated target application throughput associated with the end devices of the same network and application, as described herein.

According to an exemplary embodiment, the application differentiated-based L4S service may include a latency budget service. According to an exemplary embodiment, the latency budget service may store and manage a target latency budget for each application or application type, as described herein. According to an exemplary embodiment, the latency budget service may include measuring radio link control (RLC) delay, packet data convergence protocol (PDCP) delay, and/or another network protocol layer delay associated with packets of the application or application type, and evaluate whether the current and/or prospective latency budget satisfies the target latency budget. According to an exemplary embodiment, the latency budget service may initiate ECN marking for packets that may exceed the target latency budget for a particular application or application type. Otherwise, the latency budget service may forgo ECN marking. According to various exemplary embodiments, the latency budget service may be implemented by a network device. For example, the latency budget service may be implemented in an access network device, a core network device, and/or an external network device, as described herein.

In view of the foregoing, the application differentiated-based L4S service may unify data rate control across end devices that may be using the same application via a same network and situated in a same or proximate location. Additionally, the application differentiated-based L4S service may enhance access and use of application services that support L4S or another QoS, and ECN.

FIG. 1 is a diagram illustrating an exemplary environment 100 in which an exemplary embodiment of an application differentiated-based L4S service may be implemented. As illustrated, environment 100 includes an access network 105, an external network 115, and a core network 120. Access network 105 includes access devices 107 (also referred to individually or generally as access device 107). External network 115 includes external devices 117 (also referred to individually or generally as external device 117). Core network 120 includes core devices 122 (also referred to individually or generally as core device 122). Environment 100 further includes end devices 130 (also referred to individually or generally as end device 130).

The number, type, and arrangement of networks illustrated in environment 100 are exemplary. For example, according to other exemplary embodiments, environment 100 may include fewer networks, additional networks, and/or different networks. For example, according to other exemplary embodiments, other networks not illustrated in FIG. 1 may be included, such as an X-haul network (e.g., backhaul, mid-haul, fronthaul, etc.), a transport network, or another type of network that may support a wireless service and/or an end device application service, as described herein.

A network device, a network element, or a network function (referred to herein simply as a network device) may be implemented according to one or multiple network architectures, such as a client device, a server device, a peer device, a proxy device, a cloud device, and/or a virtualized network device. Additionally, a network device may be implemented according to various computing architectures, such as centralized, distributed, cloud (e.g., elastic, public, private, etc.), edge, fog, and/or another type of computing architecture, and may be incorporated into distinct types of network architectures (e.g., Software Defined Networking (SDN), client/server, peer-to-peer, etc.) and/or implemented with various networking approaches (e.g., logical, virtualization, network slicing, etc.). The number, the type, and the arrangement of network devices are exemplary.

Environment 100 includes communication links between the networks and between the network devices. Environment 100 may be implemented to include wired, optical, and/or wireless communication links. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number, type, and arrangement of communication links illustrated in environment 100 are exemplary.

Environment 100 may include various planes of communication including, for example, a control plane (CP), a user plane (UP), a service plane, and a network management plane. Environment 100 may include other types of planes of communication. A message communicated in support of the application differentiated-based L4S service may use at least one of these planes of communication. According to various exemplary implementations, the interface of the network device may be a service-based interface, a reference point-based interface, an Open Radio Access Network (O-RAN) interface, a 5G interface, another generation of interface (e.g., 5.5G, Sixth Generation (6G), Seventh Generation (7G), etc.), or some other type of network interface (e.g., proprietary, etc.).

Access network 105 may include one or multiple networks of one or multiple types and technologies. For example, access network 105 may be implemented to include a Fifth Generation (5G) RAN, a future generation RAN (e.g., a Sixth Generation (6G) RAN, a Seventh Generation (7G) RAN, etc.), a centralized-RAN (C-RAN), an Open-RAN (O-RAN), and/or another type of access network. Access network 105 may include a legacy RAN (e.g., a Third Generation (3G) RAN, a Fourth Generation (4G) RAN, etc.). Access network 105 may communicate with and/or include other types of access networks, such as, for example, a Wi-Fi network, a local area network (LAN), a Citizens Broadband Radio System (CBRS) network, a cloud RAN, a virtualized RAN (vRAN), a self-organizing network (SON), a wired network (e.g., optical, cable, etc.), or another type of network that provides access to or can be used as an on-ramp to access network 105 and/or core network 120.

Access network 105 may include different and multiple functional splitting, such as options 1, 2, 3, 4, 5, 6, 7, or 8 that relate to combinations of access network 105 and core network 120 including an Evolved Packet Core (EPC) network and/or a Next Generation Core (NGC)/5G core network, or the splitting of the various layers (e.g., physical layer, media access control (MAC) layer, radio link control (RLC) layer, and packet data convergence protocol (PDCP) layer, etc.), plane splitting (e.g., user plane, control plane, etc.), interface splitting (e.g., F1-U, F1-C, E1, Xn-C, Xn-U, X2-C, Common Public Radio Interface (CPRI), etc.) as well as other types of network services, such as dual connectivity (DC) or higher (e.g., a secondary cell group (SCG) split bearer service, a master cell group (MCG) split bearer, an SCG bearer service, non-standalone (NSA), standalone (SA), etc.), carrier aggregation (CA) (e.g., intra-band, inter-band, contiguous, non-contiguous, etc.), edge and core network slicing, coordinated multipoint (COMP), various duplex schemes (e.g., frequency division duplex (FDD), time division duplex (TDD), half-duplex FDD (H-FDD), etc.), and/or another type of connectivity service (e.g., NSA new radio (NR), SA NR, etc.).

According to some exemplary embodiments, access network 105 may be implemented to include various architectures of wireless service, such as, for example, macrocell, microcell, femtocell, picocell, metrocell, NR cell, Long Term Evolution (LTE) cell, non-cell, or another type of wireless architecture. Additionally, according to various exemplary embodiments, access network 105 may be implemented according to various wireless technologies (e.g., RATs, etc.), and various wireless standards, frequencies, bands, and segments of radio spectrum (e.g., centimeter (cm) wave, millimeter (mm) wave, below 6 gigahertz (GHz), above 6 GHz, higher than mm wave, C-band, licensed radio spectrum, unlicensed radio spectrum, above mm wave), and/or other attributes or technologies used for radio communication. Additionally, or alternatively, according to some exemplary embodiments, access network 105 may be implemented to include various wired and/or optical architectures for wired and/or optical access services.

Depending on the implementation, access network 105 may include one or multiple types of network devices, such as access devices 107. For example, access device 107 may include a next generation Node B (gNB), an enhanced LTE (eLTE) evolved Node B (eNB), an eNB, a radio network controller (RNC), a radio intelligent controller (RIC), a base station controller (BSC), a remote radio head (RRH), a baseband unit (BBU), a radio unit (RU), a remote radio unit (RRU), a centralized unit (CU), a CU-control plane (CP), a CU-user plane (UP), a distributed unit (DU), a small cell node (e.g., a picocell device, a femtocell device, a microcell device, a home eNB, a home gNB, etc.), an open network device (e.g., O-RAN Centralized Unit (O-CU), O-RAN Distributed Unit (O-DU), O-RAN next generation Node B (O-gNB), O-RAN evolved Node B (O-eNB)), a 5G ultra-wide band (UWB) node, a future generation wireless access device (e.g., a 6G wireless station, a 7G wireless station, or another generation of wireless station), a transport device (e.g., a router or similar network device that may support a transport layer protocol (e.g., user datagram protocol (UDP), transmission control protocol (TCP), QUIC, Real-time Transport Protocol (RTP), etc.), and/or some sub-combination such access devices 107.

Access device 107 may include other types of wireless access devices, such as a Wi-Fi device, a hotspot device, and/or a fixed wireless access customer premise equipment (FWA CPE), etc.) that provides a wireless access service. Additionally, access devices 107 may include a wired and/or an optical device (e.g., modem, wired access point, optical access point, Ethernet device, multiplexer, etc.) that provides network access and/or transport service.

According to some exemplary implementations, access device 107 may include a combined functionality of multiple RATs (e.g., 4G and 5G functionality, 5G and 5.5G functionality, 5G and 6G), etc.) via soft and hard bonding based on demands and needs. According to some exemplary implementations, access device 107 may include a split access device (e.g., a CU-control plane (CP), a CU-user plane (UP), etc.) or an integrated functionality, such as a CU-CP and a CU-UP, or other integrations of split RAN nodes. Access device 107 may be an indoor device or an outdoor device.

External network 115 may include one or multiple networks of one or multiple types and technologies that provide an application service. For example, external network 115 may be implemented using one or multiple technologies including, for example, network function virtualization (NFV), SDN, cloud computing, Infrastructure-as-a-Service (IaaS), Platform-as-a-Service (PaaS), Software-as-a-Service (SaaS), or another type of network technology. External network 115 may be implemented to include a cloud network, a private network, a public network, a multi-access edge computing (MEC) network, a fog network, the Internet, a packet data network (PDN), a service provider network, the World Wide Web (WWW), an Internet Protocol Multimedia Subsystem (IMS) network, a Rich Communication Service (RCS) network, a software-defined (SD) network, a virtual network, a packet-switched network, a data center, a data network, or other type of application service layer network that may provide access to and may host an end device application service.

Depending on the implementation, external network 115 may include various network devices such as external devices 117. For example, external devices 117 may include virtual network devices (e.g., virtualized network functions (VNFs), servers, host devices, application functions (AFs), application servers (ASs), server capability servers (SCSs), containers, hypervisors, virtual machines (VMs), pods, network function virtualization infrastructure (NFVI), and/or other types of virtualization elements, layers, hardware resources, operating systems, engines, etc.) that may be associated with application services for use by end devices 130. By way of further example, external devices 117 may include mass storage devices, transport devices, data center devices, NFV devices, SDN devices, cloud computing devices, platforms, and other types of network devices pertaining to various network-related functions (e.g., security, management, charging, billing, authentication, authorization, policy enforcement, development, etc.). Although not illustrated, external network 115 may include one or multiple types of core devices 122, as described herein.

External devices 117 may host one or multiple types of application services. For example, such application services may pertain to broadband services in dense areas (e.g., pervasive video, smart office, operator cloud services, video/photo sharing, etc.), broadband access everywhere (e.g., 50/100 Mbps, ultra-low-cost network, etc.), enhanced mobile broadband (eMBB), higher user mobility (e.g., high speed train, remote computing, moving hot spots, etc.), Internet of Things (e.g., smart wearables, sensors, mobile video surveillance, smart cities, connected home, etc.), extreme real-time communications (e.g., tactile Internet, augmented reality (AR), virtual reality (VR), etc.), lifeline communications (e.g., natural disaster, emergency response, etc.), ultra-reliable communications (e.g., automated traffic control and driving, collaborative robots, health-related services (e.g., monitoring, remote surgery, etc.), drone delivery, public safety, etc.), broadcast-like services, communication services (e.g., email, text (e.g., Short Messaging Service (SMS), Multimedia Messaging Service (MMS), etc.), massive machine-type communications (mMTC), voice, video calling, video conferencing, instant messaging), video streaming, fitness services, navigation services, online gaming, web services, and/or other types of wireless and/or wired application services. External devices 117 may also include other types of network devices that support the operation of external network 115 and the provisioning of application services, such as an orchestrator, an edge manager, an operations support system (OSS), a local domain name system (DNS), registries, and the like. External devices 117 may include non-virtual, logical, and/or physical network devices.

Core network 120 may include one or multiple networks of one or multiple network types and technologies. Core network 120 may include a complementary network of access network 105. For example, core network 120 may be implemented to include a 5G core network, an EPC of an LTE network, an LTE-Advanced (LTE-A) network, and/or an LTE-A Pro network, a future generation core network (e.g., a 5.5G, a 6G, a 7G, or another generation of core network), and/or another type of core network.

Depending on the implementation of core network 120, core network 120 may include diverse types of network devices that are illustrated in FIG. 1 as core devices 122. For example, core devices 122 may include a user plane function (UPF), a Non-3GPP Interworking Function (N3IWF), an access and mobility management function (AMF), a session management function (SMF), a unified data management (UDM) device, a unified data repository (UDR), an authentication server function (AUSF), a security anchor function (SEAF), a network slice selection function (NSSF), a network repository function (NRF), a policy control function (PCF), a network data analytics function (NWDAF), a network exposure function (NEF), a service capability exposure function (SCEF), a lifecycle management (LCM) device, a mobility management entity (MME), a packet data network gateway (PGW), an enhanced packet data gateway (ePDG), a wireless access gateway (WAG), a tunnel termination gateway (TTG), a serving gateway (SGW), a home agent (HA), a General Packet Radio Service (GPRS) support node (GGSN), a home subscriber server (HSS), an authentication, authorization, and accounting (AAA) server, a policy and charging rules function (PCRF), a policy and charging enforcement function (PCEF), a charging system (CS), a transport device, and/or a future generation core device 122 that may perform a similar function.

According to other exemplary implementations, core devices 122 may include additional, different, and/or fewer network devices than those described. For example, core devices 122 may include a non-standard or a proprietary network device, and/or another type of network device that may be well-known but not particularly mentioned herein. Core devices 122 may also include a network device that provides a multi-RAT functionality (e.g., 4G and 5G, 5G and 6G, 6G and 7G, etc.), such as an SMF with PGW control plane functionality (e.g., SMF+PGW-C), a UPF with PGW user plane functionality (e.g., UPF+PGW-U), and/or other combined nodes (e.g., an HSS with a UDM/UDR, an MME with an AMF, etc.). Also, core devices 122 may include a split core device 122. For example, core devices 122 may include a session management (SM) PCF, an access management (AM) PCF, a user equipment (UE) PCF, and/or another type of split architecture associated with another core device 122, as described herein.

End device 130 may include a device that may have communication capabilities (e.g., wireless, wired, optical, etc.). End device 130 may or may not have computational capabilities. End device 130 may be implemented as a mobile device, a portable device, a stationary device (e.g., a non-mobile device and/or a non-portable device), a device operated by a user, or a device not operated by a user. For example, end device 130 may be implemented as a smartphone, a mobile phone, a personal digital assistant, a tablet, a netbook, a wearable device (e.g., a watch, glasses, headgear, a band, etc.), a computer, a gaming device, a television, a set top box, a music device, an IoT device, a drone, a smart device, an autonomous vehicle, or another type of wireless device (e.g., another type of user equipment (UE)). End device 130 may be configured to execute diverse types of software (e.g., applications, programs, etc.). The number and the types of software may vary among end devices 130.

End device 130 may include "edge-aware" and/or "edge-unaware" application service clients. For purposes of description, end device 130 is not considered a network device. End device 130 may be implemented as a virtualized device in whole or in part.

According to an exemplary embodiment, end device 130 and external device 117 may each include logic of an exemplary embodiment of the application differentiated-based L4S service, as described herein. According to an exemplary embodiment, access device 107 and/or core device 122 may also include logic of an exemplary embodiment of the application differentiated-based L4S service, as described herein.

Figure 2A:
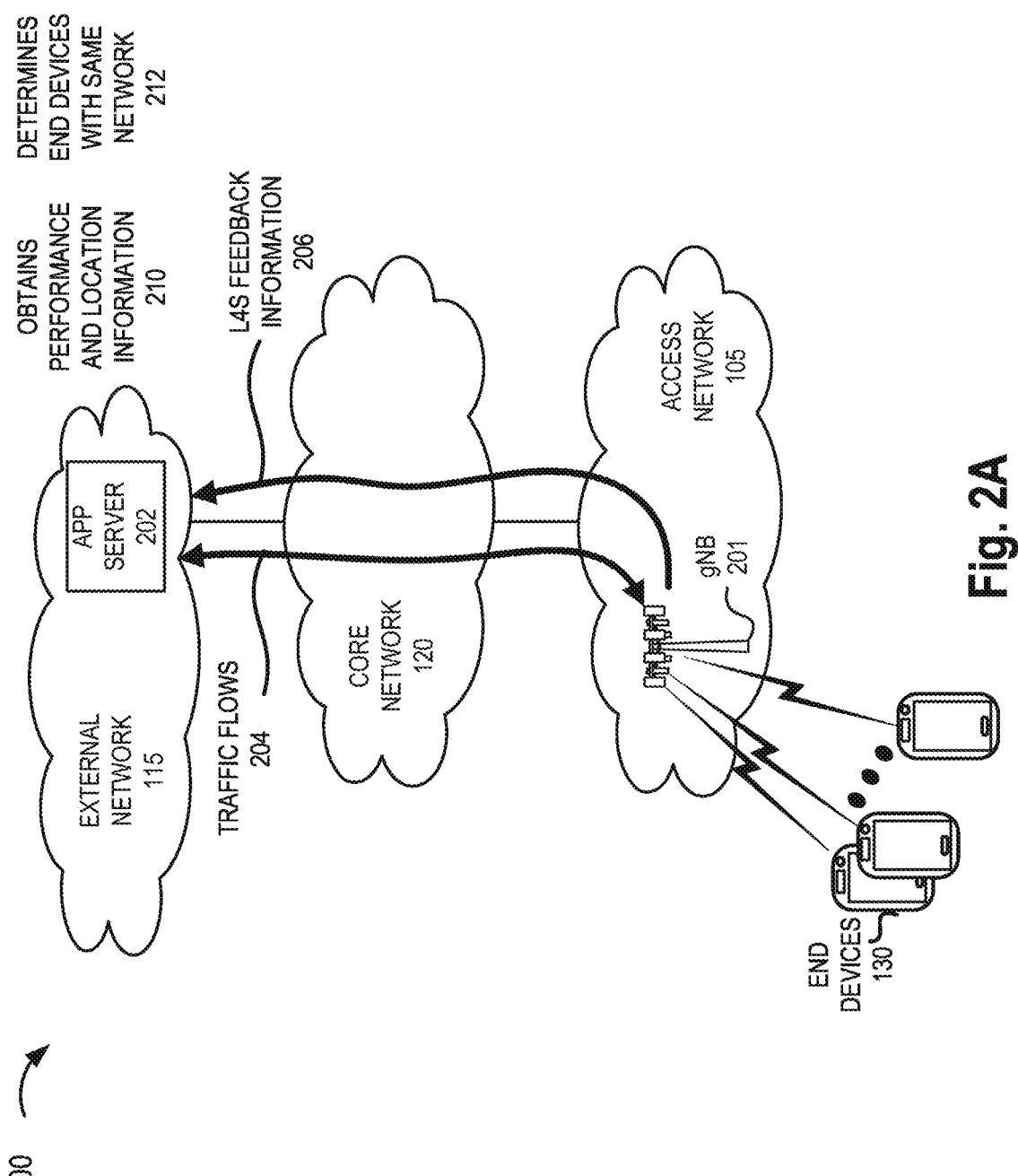
FIGS. 2A-2C is a diagram illustrating another exemplary environment in which an exemplary embodiment of the application differentiated-based L4S service may be implemented.
Figure 2B:
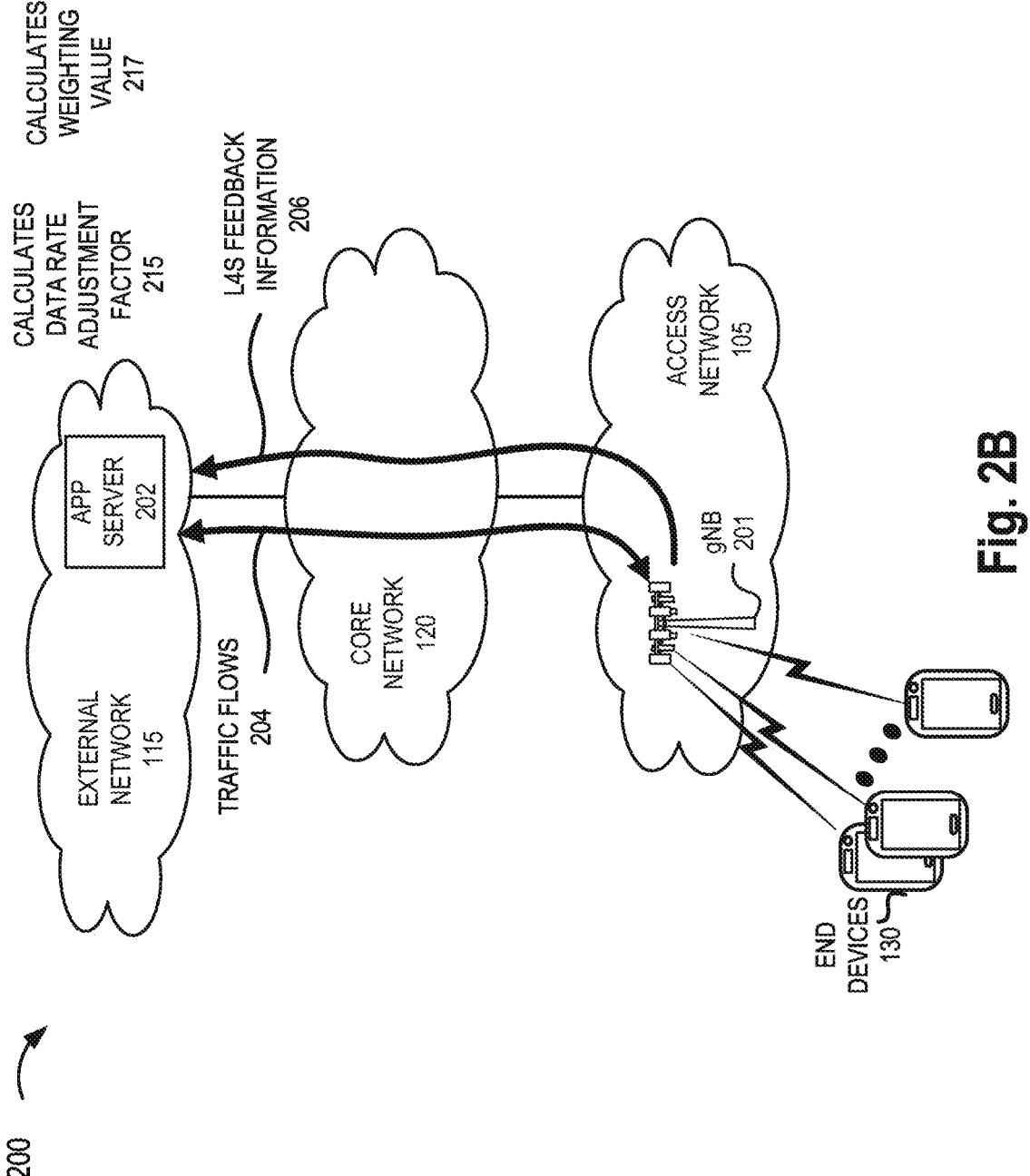
Figure 2C:
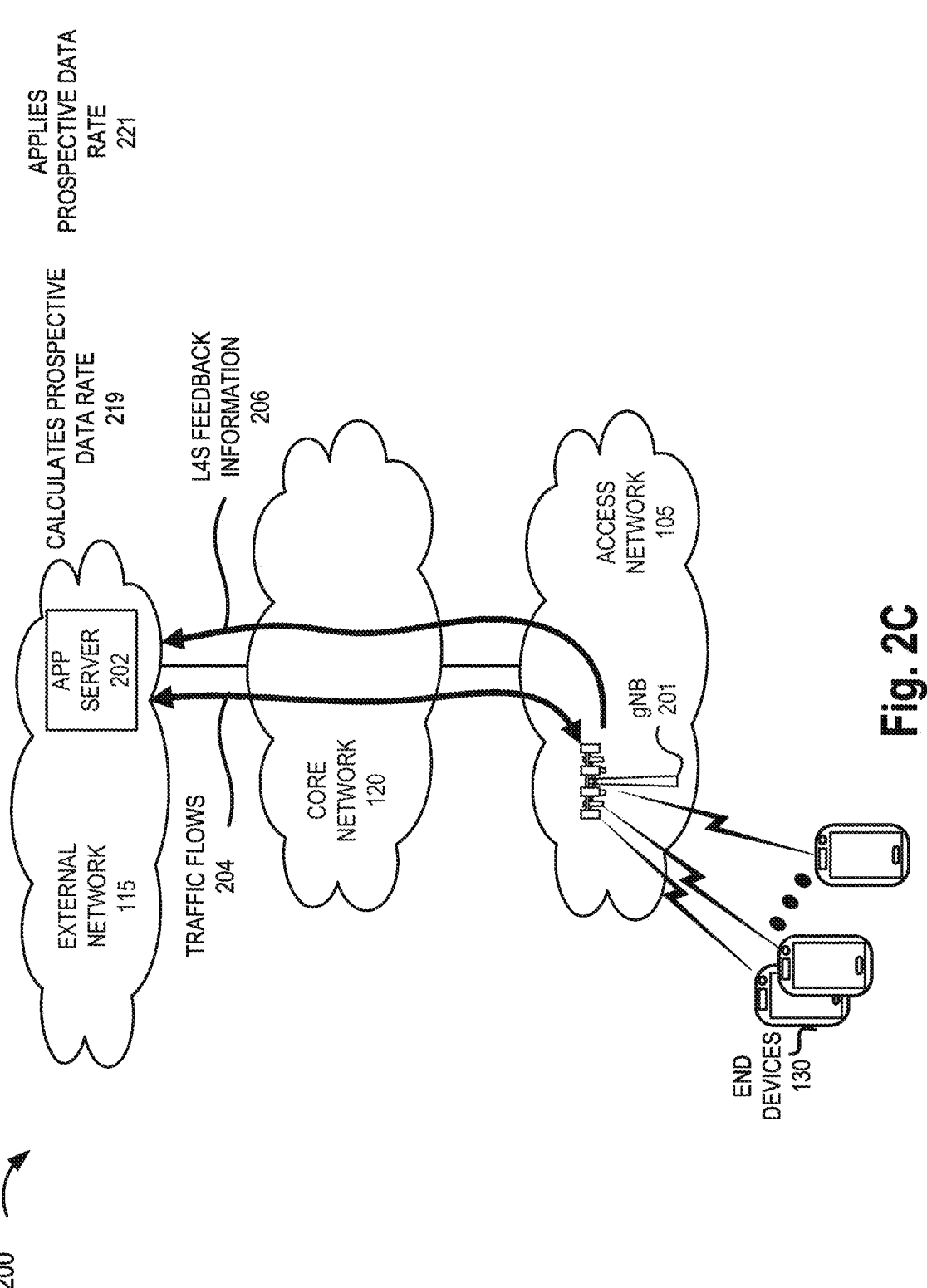

FIGS. 2A-2C are diagrams illustrating an exemplary process 200 of an exemplary embodiment of the application differentiated-based L4S service, as described herein. Referring to FIG. 2A, as illustrated, an exemplary access device 107 (e.g., a gNB 201) and an exemplary external device 117 (e.g., an application server 202) are depicted among networks 105, 115, and 120, and end device 130, as previously described.

While gNB 201 is depicted as a single gNB serving end devices 130, according to other exemplary scenarios, a subset of end devices 130 may be connected to another gNB or another type of access device 107 (not illustrated) or a different sector of gNB 201 (e.g., an antenna or an antenna array) compared to another subset of end devices 130. According to other exemplary environments for process 200, core network 120 may be omitted. For example, traffic flows 204 and feedback information 206 may not traverse core network 120.

According to an exemplary scenario, end devices 130 may have established application sessions, which include traffic flows 204, with application server 202. According to one example, end devices 130 may be served within the same sector or antenna array of gNB 201. Additionally, application server 202 may receive L4S feedback information 206 from end devices 130. For example, feedback information 206 may include performance data and location information, as described herein. According to this exemplary scenario, end devices 130 may be using the same application (e.g., provided/hosted by application server 202) via a same network, as described herein.

As illustrated and included in process 200, application server 202 may obtain 210 performance and location information (e.g., included in L4S feedback information 206) from each end device 130 of end devices 130. Based on the performance and location information, application server 202 may determine 212 that end devices 130 are associated using a same network. For example, application server 202 may determine that end devices 130 are in a same radio coverage area and/or connected to a same access device 107, such as gNB 201.

Referring to FIG. 2B, application server 202 may calculate 215 a data rate adjustment factor. For example, for each end device 130, application server 202 may calculate an ECN rate. The ECN rate may be implemented as a percentage or another numerical value, ratio, or the like pertaining to ECN marked packets. Additionally, for each end device 130, application server 202 may calculate a performance metric value based on the performance data. Application server 202 may calculate the data rate adjustment factor based on the ECN rate and the performance metric value.

Application server 202 may calculate 217 a weighting value. For example, application server 202 may calculate the weighting value based on a ratio of throughput values. For example, the throughput values may include a next target throughput value associated with end device 130 relative to an aggregated target throughput value associated with end devices 130.

Referring to FIG. 2C, application server 202 may calculate 219 a prospective data rate. For example, for each end device 130, application server 202 may calculate prospective data rate based on the weighting value, the data rate adjustment factor, and a current data rate. Based on the prospective data rate, application server 202 may apply 221 or execute the prospective application data rate for each of the end devices 130. For example, during the prospective time period (e.g., an L4S evaluation period defined by application server 202) of the application session, application server 202 may apply the respective prospective application data rates for each of end devices 130.

FIGS. 2A-2C are diagrams illustrating exemplary steps or operations of process 200, however, according to other exemplary embodiments, process 200 may include additional, different, and/or fewer steps or operations than those illustrated and described in relation to FIGS. 2A-2C. For example, application server 202 may determine whether the number of end devices 130 that are associated with the same application and the same network also satisfy a threshold value. For example, the threshold value may indicate a minimum number of end devices 130. When the threshold value is not satisfied, application server 202 may continue to loop through the steps depicted in FIG. 2A. Otherwise, when the threshold value is satisfied, process 200 may continue to FIG. 2B and onward, as described herein.

Figure 3:
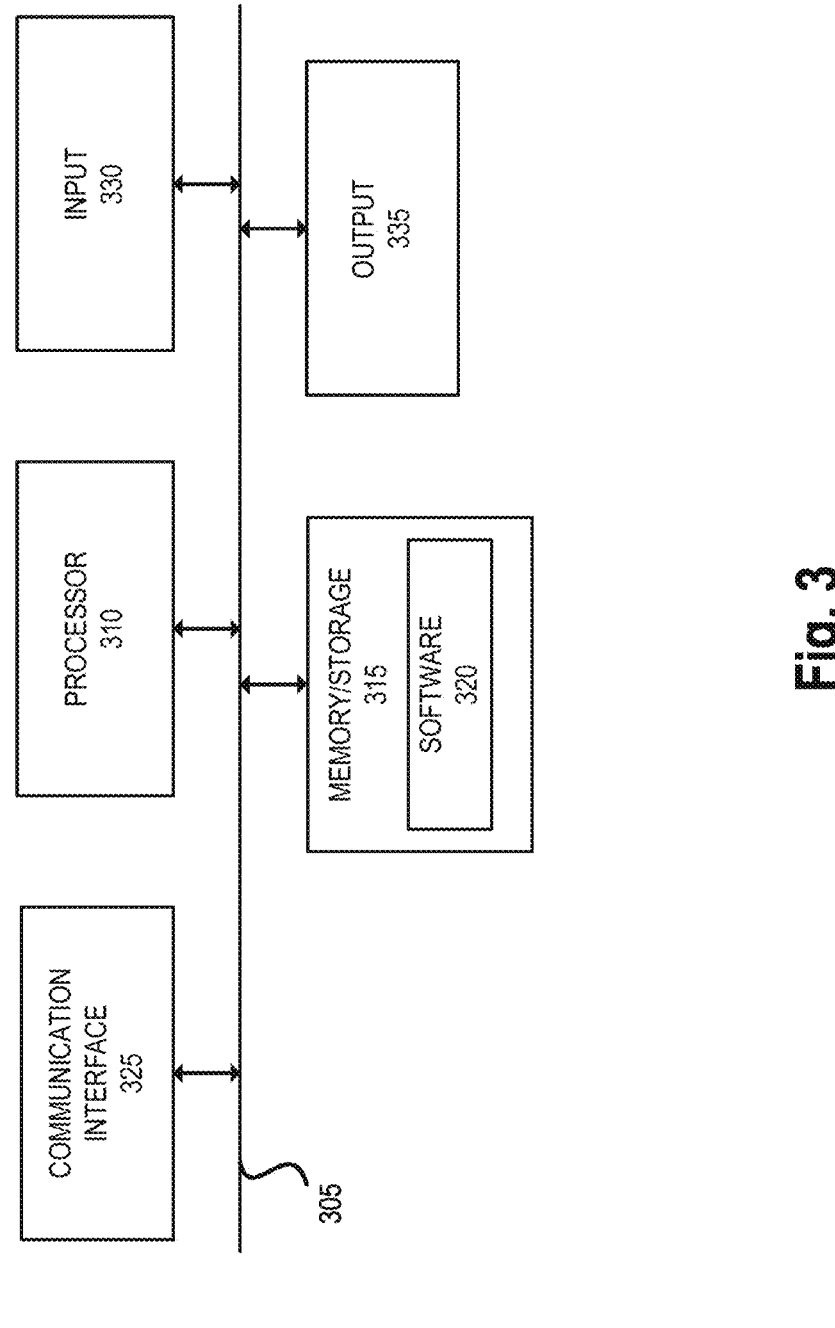
FIG. 3 is a diagram illustrating exemplary components of a device that may correspond to one or more of the devices illustrated and described herein.

FIG. 3 is a diagram illustrating exemplary components of a device 300 that may be included in one or more of the devices described herein. For example, device 300 may correspond to access device 107, external device 117, core device 122, end device 130, and/or other types of devices, as described herein. As illustrated in FIG. 3, device 300 includes a bus 305, a processor 310, a memory/storage 315 that stores software 320, a communication interface 325, an input 330, and an output 335. According to other embodiments, device 300 may include fewer components, additional components, different components, and/or a different arrangement of components than those illustrated in FIG. 3 and described herein.

Bus 305 includes a path that permits communication among the components of device 300. For example, bus 305 may include a system bus, an address bus, a data bus, and/or a control bus. Bus 305 may also include bus drivers, bus arbiters, bus interfaces, clocks, and so forth.

Processor 310 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 310 may be implemented as hardware (e.g., a microprocessor, etc.), a combination of hardware and software (e.g., a SoC, an ASIC, etc.), may include one or multiple memories (e.g., cache, etc.), etc.

Processor 310 may control the overall operation, or a portion of operation(s) performed by device 300. Processor 310 may perform one or multiple operations based on an operating system and/or various applications or computer programs (e.g., software 320). Processor 310 may access instructions from memory/storage 315, from other components of device 300, and/or from a source external to device 300 (e.g., a network, another device, etc.). Processor 310 may perform an operation and/or a process based on various techniques including, for example, multithreading, parallel processing, pipelining, interleaving, learning, model-based, etc.

Memory/storage 315 includes one or multiple memories and/or one or multiple other types of storage mediums. For example, memory/storage 315 may include one or multiple types of memories, such as, a random access memory (RAM), a dynamic RAM (DRAM), a static RAM (SRAM), a cache, a read only memory (ROM), a programmable ROM (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 315 may include a hard disk (e.g., a magnetic disk, an optical disk, a magneto-optic disk, a solid-state component, etc.), a Micro-Electromechanical System (MEMS)-based storage medium, and/or a nanotechnology-based storage medium.

Memory/storage 315 may be external to and/or removable from device 300, such as, for example, a Universal Serial Bus (USB) memory stick, a dongle, a hard disk, mass storage, off-line storage, or some other type of storing medium. Memory/storage 315 may store data, software, and/or instructions related to the operation of device 300.

Software 320 includes an application or a program that provides a function and/or a process. As an example, with reference to external device 117 or application server 202, software 320 may include an application that, when executed by processor 310, provides a function and/or a process of the application differentiated-based L4S service, as described herein. According to another example, with reference to end device 130, access device 107, and/or core device 122, software 320 may include an application that, when executed by processor 310, provides a function and/or a process of the application differentiated-based L4S service, as described herein. Software 320 may also include firmware, middleware, microcode, hardware description language (HDL), and/or another form of instruction. Software 320 may also be virtualized. Software 320 may further include an operating system (OS) (e.g., Windows, Linux, Android, proprietary, etc.).

Communication interface 325 permits device 300 to communicate with other devices, networks, systems, and/or the like. Communication interface 325 includes one or multiple wireless interfaces, optical interfaces, and/or wired interfaces. For example, communication interface 325 may include one or multiple transmitters and receivers, or transceivers. Communication interface 325 may operate according to a protocol stack and a communication standard.

Input 330 permits an input into device 300. For example, input 330 may include a keyboard, a mouse, a display, a touchscreen, a touchless screen, a button, a switch, an input port, speech recognition logic, and/or some other type of visual, auditory, tactile, affective, olfactory, etc., input component. Output 335 permits an output from device 300. For example, output 335 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, PaaS, etc.). Device 300 may be implemented in the same manner. For example, device 300 may be instantiated, created, deleted, or some other operational state during its life-cycle (e.g., refreshed, paused, suspended, rebooted, or another type of state or status), using well-known virtualization technologies. For example, access device 107, core device 122, external device 117, and/or another type of network device or end device 130, as described herein, may be a virtualized device.

Device 300 may be configured to perform a process and/or a function, as described herein, in response to processor 310 executing software 320 stored by memory/ storage 315. By way of example, instructions may be read into memory/storage 315 from another memory/storage 315 (not shown) or read from another device (not shown) via communication interface 325. The instructions stored by memory/storage 315 may configure device 300 and/or cause processor 310 to perform a function or a process described herein. Alternatively, for example, according to other implementations, device 300 may be configured to perform a function or a process described herein based on the execution of hardware (processor 310, etc.).

FIG. 4 is a flow diagram illustrating another exemplary process 400 of an exemplary embodiment of the application differentiated-based L4S service. According to an exemplary embodiment, an application server or a similar network device may perform a step of process 400. According to an exemplary implementation, processor 310 executes software 320 to perform a step (in whole or in part) of process 400, as described herein. Alternatively, a step (in whole or in part) may be performed by execution of only hardware.

Referring to FIG. 4, in block 405, application server 202 may establish and maintain application sessions of a same application service with end devices 130 via a same network, as described herein.

In block 410, application server 202 may obtain L4S feedback information from each of end devices 130. For example, the L4S feedback information may include performance data and location information, as described herein.

In block 415, application server 202 may determine that the number of end devices 130 satisfies a threshold value. For example, based on the feedback information, application server 202 may compare the number of end devices 130 associated with the same network and application service to a threshold value, which may indicate a minimum number of end devices 130 to which the application differentiated-based L4S service is applied. As previously described, when application server 202 determines that the number of end devices 130 do not satisfy the threshold value, application server 202 may return to block 405 of process 400, for example.

In block 420, application server 202 may monitor an ECN rate for each of the end devices 130. For example, application service 202 may determine a percentage or number of ECN marked packets associated with each application session and each end device 130 of a group of end devices 130 pertaining to the same network and the same application.

In block 425, application server 202 may calculate a data rate adjustment factor for each of the end devices 130 based on the ECN rate and the L4S feedback information. For example, application server 202 may calculate the data rate adjustment factor based on the following exemplary expression:

$$X_{i,tk}(c_{i,tk}, q_{i,p,tk}), \tag{1}$$

in which $x_{i,tk}$ denotes the application data rate adjustment factor for the ith end device 130 at t=tk; $c_{i,tk}$ denotes the ECN rate for the ith end device 130 at t=tk; and $q_{i,p,tk}$ denotes the performance data, as described herein, for the ith end device 130 at t=tk.

In block 430, application server 202 may calculate a weighting value for each of the end devices 130. For example, application server 202 may calculate the weighting value based on the following exemplary expression:

$$w_{i,tk} = f\left(\frac{h_{i,tk}}{\sum_{i=1}^{n} h_{i,tk}}\right), \tag{2}$$

in which $w_{i,tk}$ denotes the weighting factor value for the ith end device 130 at t=tk+1; $h_{i,tk}$ denotes the application data rate for the ith end device 130 at t=tk; and $f$ is a function of a ratio between the next target application throughput for the ith end device 130 and the total aggregate application throughput for end devices 130. For example, a 5 Megabits (Mbps) reduction for each end device 130 may result in up to 50 Mbps for 10 end devices under the same network. Thus, $w_i$, $t_{k+1}$ may be reduced as the number of end devices 130 increases regarding the same network.

In block 435, application server 202 may calculate a prospective application data rate for each of the end devices 130. For example, application server 202 may calculate the prospective application data rate based on the following exemplary expression:

$$h_{i,tk+1} = w_{i,tk} h_{i,tk} x_{i,tk}(c_{i,tk}, q_{i,ptk}), \tag{3}$$

in which $w_{i,tk}$ denotes the weighting factor value of expression (2) for the ith end device 130 at t=tk; $h_{i,tk}$ denotes the application data rate for the ith end device 130 at t=tk; $x_{i,tk}$ denotes the application data rate adjustment factor for the ith end device 130 at t=tk; $c_{i,tk}$ denotes the ECN rate for the ith end device 130 at t=tk; $q_{i,ptk}$ denotes the performance metric value, as described herein, for the ith end device 130 at t=tk; and $h_{i,tk+1}$ denotes the prospective application data rate for the ith end device 130 at t=tk+1. According to expression (3), $x_{i,tk}$ is a function of $c_{i,tk}$ and $q_{i,ptk}$. Application server 202 may calculate a current application data rate (e.g., $h_{i,tk}$) for each end device 130.

In block 440, application server 202 may execute the prospective application data rate for each of the end devices 130. For example, during the prospective time period and the application session, application server 202 may apply the prospective application data rate for end device 130.

FIG. 4 illustrates an exemplary process 400 of the application differentiated-based L4S service, however, according to other exemplary embodiments, the application differentiated-based L4S service may perform additional operations, fewer operations, and/or different operations than those illustrated and described in relation to FIG. 4. For example, application server 202 may not perform blocks 425-440 when the number of end devices 130 does not satisfy the threshold value.

Figure 5:
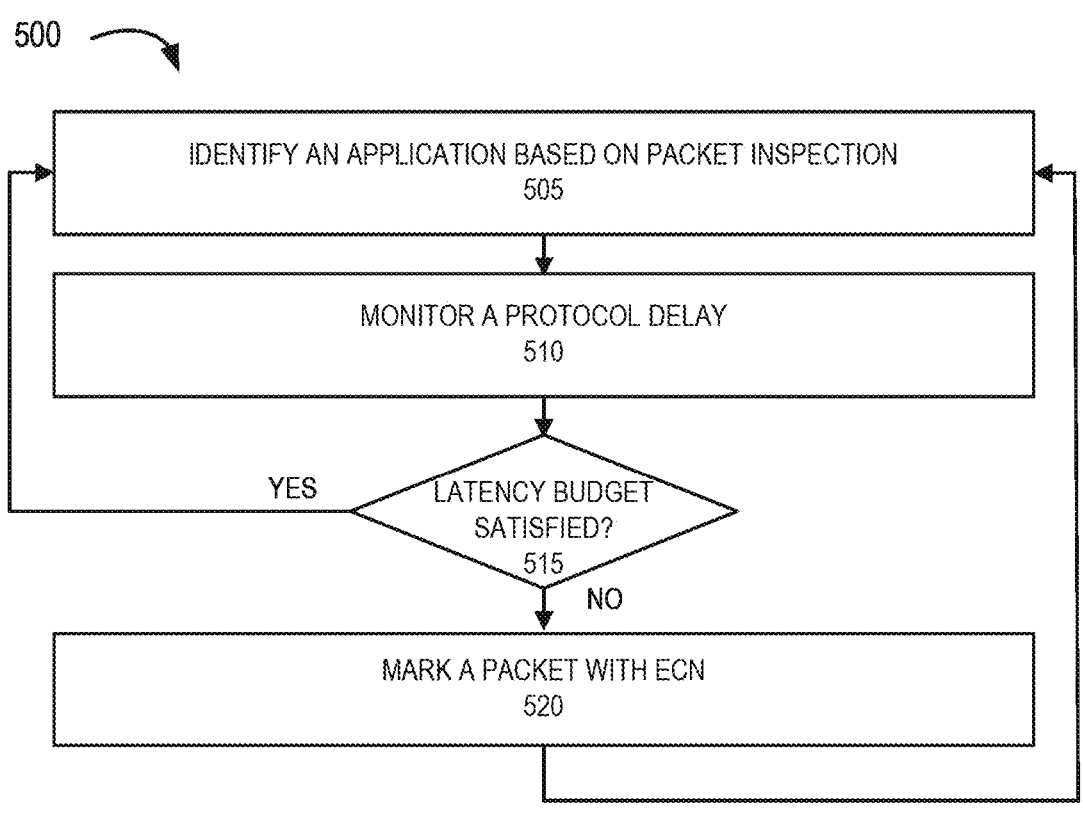
FIG. 5 is a flow diagram illustrating another exemplary process of an exemplary embodiment of the application differentiated-based L4S service.

FIG. 5 is a flow diagram illustrating another exemplary process 500 of an exemplary embodiment of the application differentiated-based L4S service. According to an exemplary embodiment, access device 107, core device 122, or another type of network device (e.g., intermediary network device) in the user plane of an application session may perform a step of process 500. According to an exemplary implementation, processor 310 executes software 320 to perform a step (in whole or in part) of process 500, as described herein. Alternatively, a step (in whole or in part) may be performed by execution of only hardware. For purposes of description, process 500 is described as being performed by a user plane device (e.g., core device 122, access device 107, or the like).

Referring to FIG. 5, in block 505, the user plane device may identify an application based on packet inspection. For example, the user plane device may perform packet inspection (e.g., deep packet inspection (DPI), deep content inspection, or another type of packet inspection) to identify an application (e.g., an application identifier or the like that uniquely identifies the application) or an application type of the application (e.g., a category of the application, such as extreme real-time communication, ultra-reliable communication, etc.) associated with packets communicated between application server 202 and end device 130 via the user plane device during an application session, as described herein.

In block 510, the user plane device may monitor a protocol delay. For example, the user plane device may monitor and/or measure one or multiple delays associated with one or multiple protocols (e.g., RLC, PDCP, or another network layer of a protocol stack) and packets associated with the application and application session.

In block 515, the user plane device may determine whether a latency budget is satisfied. For example, the user plane device compare the measured delay to a threshold value. The threshold value may be derived based on the application or application type and indicate a maximum delay budget, for example.

When the latency budget is satisfied (block 515—YES), process 500 may return to block 505 in which the user plane device may identify the application based on the packet inspection with respect to a next set of packets.

When the latency budget is not satisfied (block 515—NO), the user plane device may mark the packets with an ECN or the like (block 520). For example, the ECN marking may include use of a codepoint (e.g., ECT (1) or "01" to indicate ECN-Capable Transport (L4S)) of the ECN codepoints and a codepoint (e.g., congestion experienced (CE) or "11") to indicate congestion as an explicit congestion signal. According to other examples, the application differentiated-based L4S service may use other known ECN schemes in which packets may be marked according to configured ECN scheme/codepoints that provide feedback and assist in managing a congestion event. Process 500 may return to block 505.

FIG. 5 illustrates an exemplary process 500 of the application differentiated-based L4S service, however, according to other exemplary embodiments, the application differentiated-based L4S service may perform additional operations, fewer operations, and/or different operations than those illustrated and described in relation to FIG. 5.

As set forth in this description and illustrated by the drawings, reference is made to "an exemplary embodiment," "exemplary embodiments," "an embodiment," "embodiments," etc., which may include a particular feature, structure, or characteristic in connection with an embodiment(s). However, the use of the phrase or term "an embodiment," "embodiments," etc., in various places in the description does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described regarding the processes illustrated in FIGS. 4 and 5, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 310, etc.), or a combination of hardware and software (e.g., software 320).

Embodiments have been described without reference to the specific software code because the software code can be designed to implement the embodiments based on the description herein and commercially available software design environments and/or languages. For example, diverse types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 310) of a device. A non-transitory storage medium includes one or more of the storage mediums described in relation to memory/storage 315. The non-transitory computer-readable storage medium may be implemented in a centralized, distributed, or logical division that may include a single physical memory device or multiple physical memory devices spread across one or multiple network devices.

To the extent the aforementioned embodiments collect, store, or employ personal information of individuals, it should be understood that such information shall be collected, stored, and used in accordance with all applicable laws concerning protection of personal information. Additionally, the collection, storage and use of such information can be subject to the consent of the individual to such activity, for example, through well known "opt-in" or "opt-out" processes as can be appropriate for the situation and type of information. Collection, storage, and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

For purposes of description, the term "packet" is intended to be broadly interpreted to include a data transmission or communication, the packaging of which may correspond to, for example, a packet, a cell, a frame, a datagram, some other type of container or unit of data, or a fragment thereof. A "packet flow" or "flow of packets" may be interpreted as a sequence or series of packets that share certain attributes, such as the same source and destination IP addresses, the same source and destination ports, and so forth, as understood in the art. According to various exemplary embodiments, the application differentiated-based L4S service may pertain to an IP version 4 (IPv4) packet flow, an IP version 6 (IPv6) packet flow, a guaranteed bit rate (GBR) QoS flow, a non-GBR QoS flow, a PDU session flow, an L4S packet flow, or the like.

What is claimed is:

1. A method comprising:
receiving, by a network device hosting an application, feedback information from end devices associated with application sessions of the application with the network device and supported by low latency, low loss, scalable throughput (L4S), wherein the feedback information includes performance metric values, the performance metric values including round-trip time values, packet loss values, and throughput values;
calculating, by the network device based on the feedback information, a data rate adjustment value for each of the end devices;
calculating, by the network device, a weighting value for each of the end devices;
calculating, by the network device, a prospective data rate for each of the end devices based on the data rate adjustment value, the weighting value, and a current data rate; and
applying, by the network device, each prospective data rate during each of the application sessions of a prospective time period.

2. The method of claim 1, further comprising:
determining, by the network device, that the end devices are connected to a same network including a same physical cell identifier or a same global cell identifier.

3. The method of claim 1, further comprising:
determining, by the network device, that a number of the end devices satisfy a threshold value indicating a minimum number of end devices.

4. The method of claim 1, wherein calculating the weighting value comprises:
calculating, by the network device, a ratio value for each of the end devices, wherein the ratio value is calculated based on a throughput value of a first end device of the end devices relative to an aggregated throughput value of the end devices.

5. The method of claim 1, wherein calculating the data rate adjustment value comprises:
calculating, by the network device, an explicit congestion notification percentage value for each of the end devices.

6. The method of claim 1, wherein the feedback information from each of the end devices includes a network identifier that indicates at least one of a cell identifier or a radio bearer identifier.

7. The method of claim 1, further comprising:
calculating, by the network device, a current data rate for each of the end devices.

8. The method of claim 1, wherein the feedback information includes geographical coordinates from each of the end devices.

9. A network device comprising:
a processor, wherein the processor is configured to:
receive feedback information from end devices associated with application sessions of an application hosted by and with the network device and supported by low latency, low loss, scalable throughput (L4S), wherein the feedback information includes performance metric values, the performance metric values including round-trip time values, packet loss values, and throughput values;
calculate, based on the feedback information, a data rate adjustment value for each of the end devices;
calculate a weighting value for each of the end devices;
calculate a prospective data rate for each of the end devices based on the data rate adjustment value, the weighting value, and a current data rate; and
apply each prospective data rate during each of the application sessions of a prospective time period.

10. The network device of claim 9, wherein the processor is further configured to:
determine that the end devices are connected to a same network including a same physical cell identifier or a same global cell identifier.

11. The network device of claim 9, wherein the processor is further configured to:
determine that a number of the end devices satisfy a threshold value indicating a minimum number of end devices.

12. The network device of claim 9, wherein, when calculating the weighting value, the processor is further configured
calculate a ratio value for each of the end devices, wherein the ratio value is calculated based on a throughput value of a first end device of the end devices relative to an aggregated throughput value of the end devices.

13. The network device of claim 9, wherein, when calculating the data rate adjustment value, the processor is further configured to:
calculate an explicit congestion notification percentage value for each of the end devices.

14. The network device of claim 9, wherein the feedback information from each of the end devices includes a network identifier that indicates at least one of a cell identifier or a radio bearer identifier.

15. The network device of claim 9, wherein the processor is further configured to:

calculate a current data rate for each of the end devices.

16. The network device of claim 9, wherein the feedback information includes geographical coordinates from each of the end devices.

17. A non-transitory computer-readable storage medium storing instructions executable by a processor of a network device, wherein the instructions are configured to:

receive feedback information from end devices associated with application sessions of an application hosted by and with the network device and supported by low latency, low loss, scalable throughput (L4S), wherein the feedback information includes performance metric values, the performance metric values including round-trip time values, packet loss values, and throughput values;

calculate, based on the feedback information, a data rate adjustment value for each of the end devices;

calculate a weighting value for each of the end devices;

calculate a prospective data rate for each of the end devices based on the data rate adjustment value, the weighting value, and a current data rate; and apply each prospective data rate during each of the application sessions of a prospective time period.

18. The non-transitory computer-readable storage medium of claim 17, wherein the instructions are further configured to:

determine that the end devices are connected to a same network including a same physical cell identifier or a same global cell identifier.

19. The non-transitory computer-readable storage medium of claim 17, wherein the instructions are further configured to:

determine that a number of the end devices satisfy a threshold value indicating a minimum number of end devices.

20. The non-transitory computer-readable storage medium of claim 17, wherein the instructions to calculate the weighting value are further configured to:

calculate a ratio value for each of the end devices, wherein the ratio value is calculated based on a throughput value of a first end device of the end devices relative to an aggregated throughput value of the end devices.

\* \* \* \* \*